United States Patent [19]

Olynyk

[11] Patent Number: 5,331,922

[45] Date of Patent: Jul. 26, 1994

[54] FEEDER FOR BALES OF FEED MATERIAL

[76] Inventor: Steven Olynyk, Box 6352, Drayton Valley, Alberta, Canada, T0E 0M0

[21] Appl. No.: 72,314

[22] Filed: Jun. 3, 1993

[30] Foreign Application Priority Data

Jun. 26, 1992 [CA] Canada ................................. 2072539

[51] Int. Cl.⁵ ............................................. A01K 1/10
[52] U.S. Cl. ...................................... 119/60; 119/58; 119/51.03
[58] Field of Search .................. 119/58, 59, 60, 51.03, 119/10

[56] References Cited

U.S. PATENT DOCUMENTS

| | | | |
|---|---|---|---|
| 68,151 | 8/1867 | Beals | 119/59 |
| 333,722 | 1/1886 | Bickerstaff | 119/59 |
| 387,892 | 8/1888 | Light | 119/60 |
| 3,004,518 | 10/1961 | Struckhoff | 119/58 |
| 3,020,881 | 2/1962 | Strom | 119/60 |
| 4,067,298 | 1/1978 | Jones et al. | 119/60 |
| 4,302,139 | 11/1981 | Malish | 119/60 |
| 5,158,040 | 10/1992 | Martin | 119/60 |

Primary Examiner—Gene Mancene
Assistant Examiner—Todd E. Manahan
Attorney, Agent, or Firm—Davis, Bujold & Streck

[57] ABSTRACT

This feeder for bales of feed material consists of a wall structure defining an enclosure adapted to receive one or more bales of feed material. The wall structure has openings whereby animals gain access to the feed material. At least one reserve bale support is mounted on a top peripheral edge of the wall structure. A reserve bale is deposited into the enclosure by pivoting the bale support.

3 Claims, 3 Drawing Sheets

FEEDER FOR BALES OF FEED MATERIAL

The present invention relates to a feeder for bales of feed material.

BACKGROUND OF THE INVENTION

Bale feeders are used to feed cattle whenever the forage available is insufficient due to seasonal conditions. The bale feeders are intended to accommodate either a multiplicity of small bales or one or two large bales. Cattlemen generally check their herds of cattle on a daily basis. Whenever the feed in the bale feeder is depleted they must replenish the supply by adding additional bales. Adverse weather conditions (for example: obscured visibility, snow accumulations, frigid temperatures, or high winds) can make the job difficult, hard on equipment and potentially hazardous.

SUMMARY OF THE INVENTION

What is required is a bale feeder with a reserve capacity so a cattleman can avoid having to replenish the feeder under adverse conditions.

According to the present invention there is provided a feeder for bales of feed material which is comprised of a wall structure defining an enclosure adapted to receive one or more bales of feed material. The wall structure has openings whereby animals gain access to the feed material. At least one reserve bale support is mounted on a top peripheral edge of the wall structure. Means is provided for moving a reserve bale from the bale support into the enclosure.

With the present invention a cattleman is able to draw upon reserve bales whenever the weather conditions are adverse or he does not have the time to refill the feeder. The preferred manner of moving the reserve bale from the bale support into the enclosure is by having the bale support pivotally moveable from a substantially horizontal supporting position to a substantially inwardly inclined unloading position. In the unloading position the reserve bale slides down the incline of the bale support into the enclosure.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 2B:
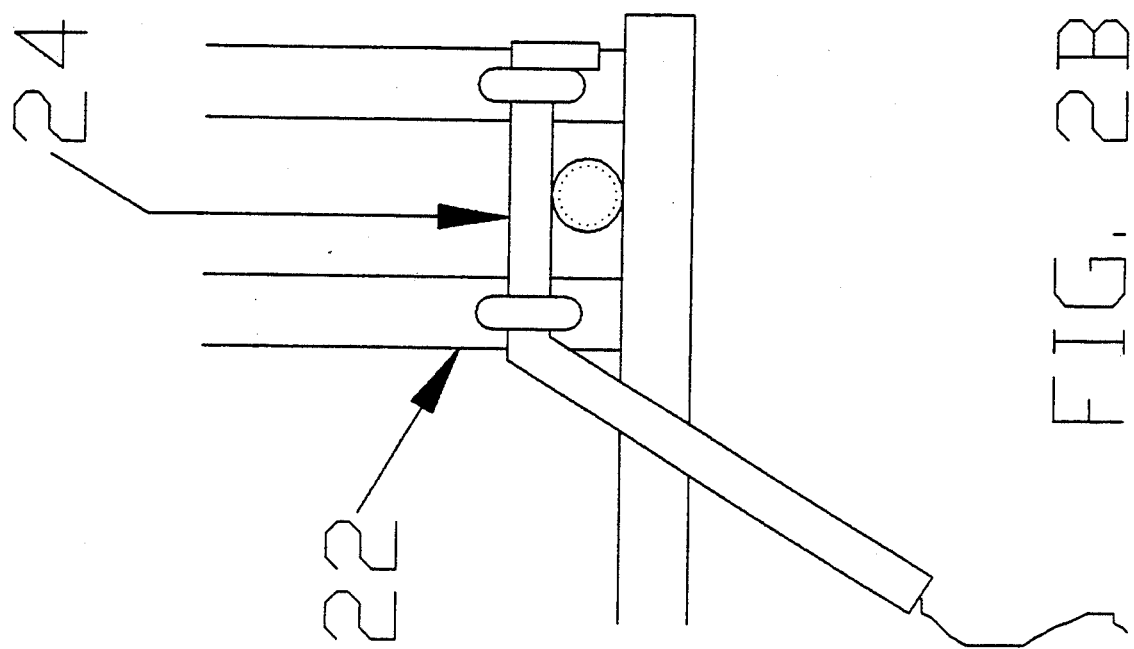
FIG. 2a and 2b are detailed views of a locking mechanism for the bale feeder illustrated in FIG. 1.
Figure 2A:
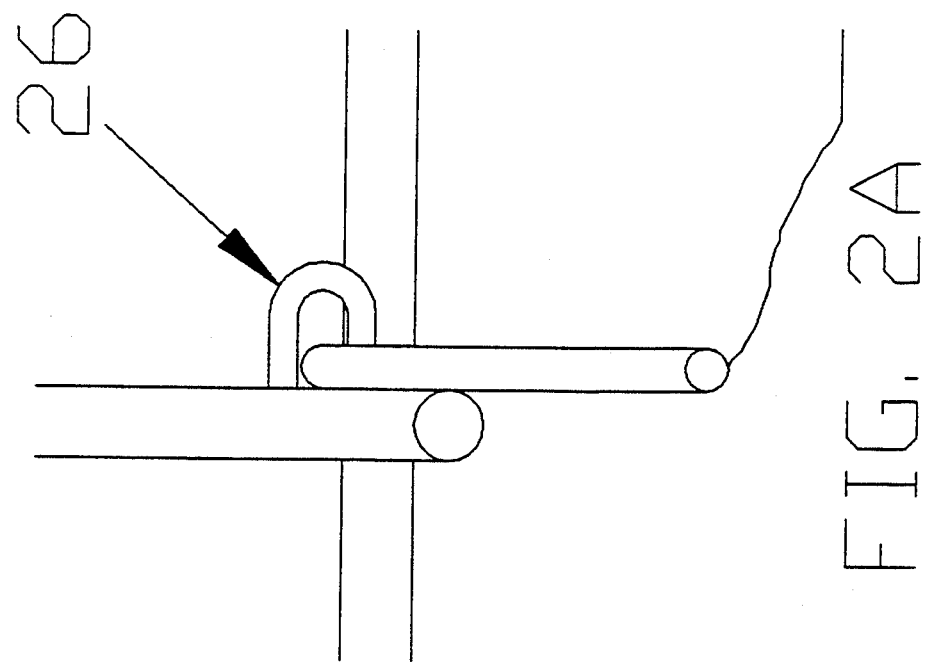
Figure 3:
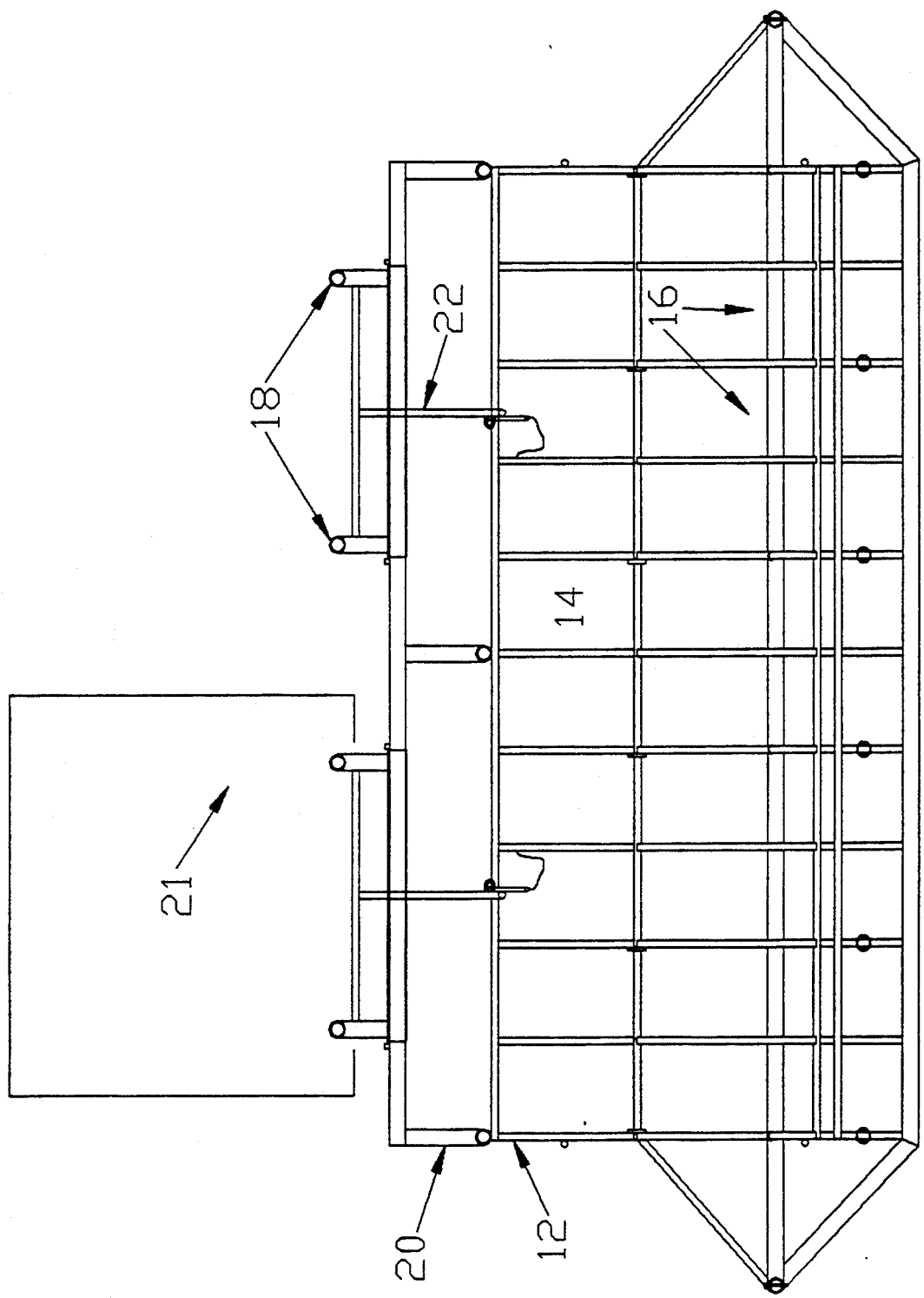
FIG. 3 is an end elevation view of the bale feeder illustrated in FIG. 1.

The preferred embodiment, a feeder for bales of feed material generally identified by reference numeral 10, will now be described with reference to FIGS. 1 through 3.

Figure 1:
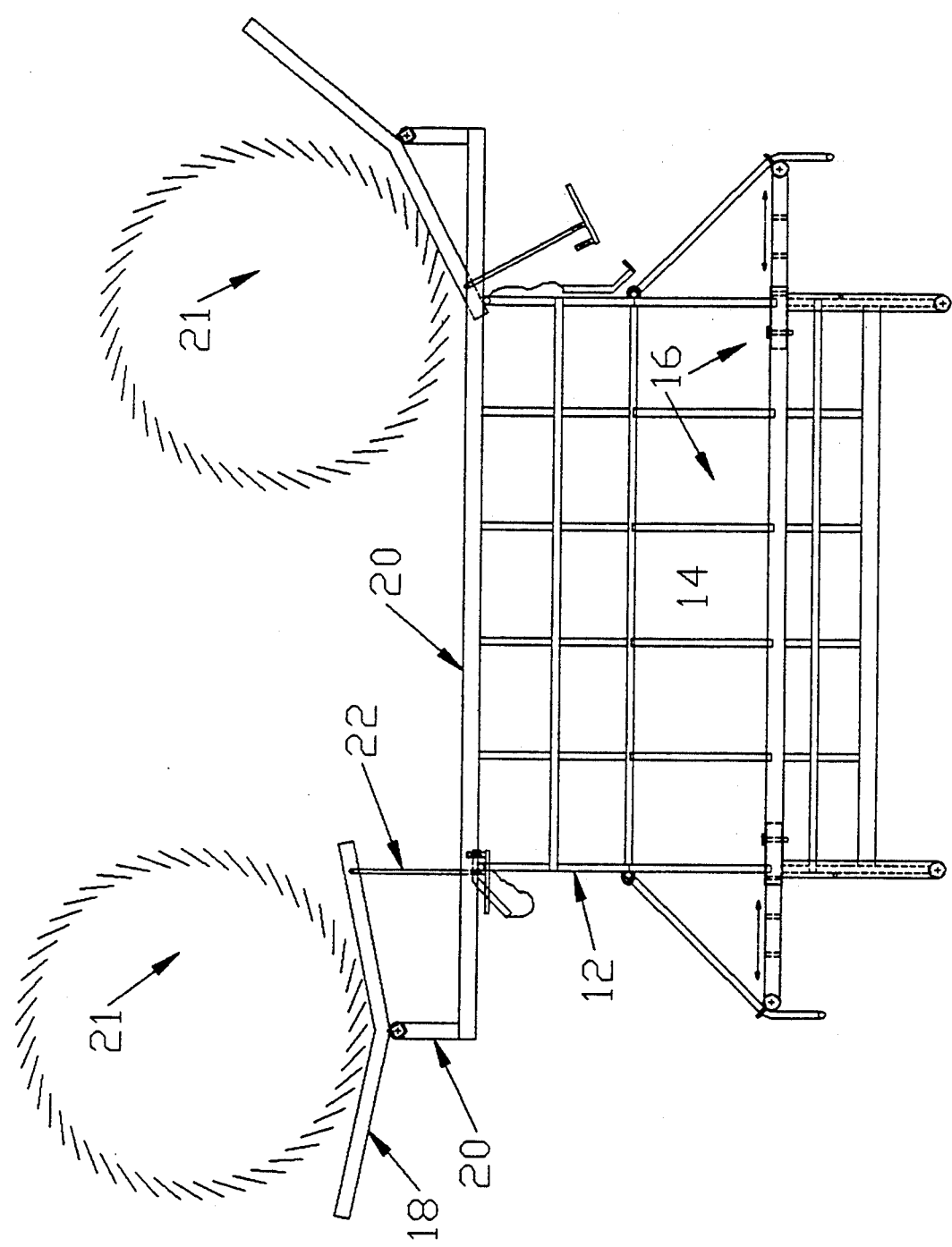
FIG. 1 is side elevation view of a bale feeder constructed in accordance with the teachings of the present invention.

Referring to FIG. 1, bale feeder 10 consists of a wall structure generally identified by reference numeral 12. Wall structure 12 defines an enclosure 14, which is adapted to receive one or more bales of feed material (not shown). Wall structure 12 has openings 16 whereby animals gain access to the feed material. Two reserve bale supports 18 are mounted on a top peripheral edge 20 of wall structure 12. The means for moving a reserve bale 21 from one of bale supports 18 is through a pivoting action. Each of bale supports 18 is pivotally moveable from a substantially horizontal supporting position to a substantially inwardly inclined unloading position. Each of bale supports 18 have a locking mechanism 22 which is releasably attached to wall structure 12, whereby each of bale supports 18 is maintained in a supporting position. Referring to FIG. 2, the means for releasably attaching locking mechanism 22 to wall structure 12 is a pin 24 which when inserted through two loops 26 on locking mechanism 22 serves to engage therebetween a portion of wall structure 12.

The use and operation of bale feeder 10 will now be described with reference to FIGS. 1 through 3. The weight of bale 21 is maintained on the pivot point of bale-support 18. Locking mechanism 22 prevents an overbalancing of bale supports 18 in the supporting position. Locking mechanism 22 is releasably secured to wall structure 12 by inserting pin 24 through loops 26, as will be understood from a review of FIGS. 2 and 3. With bale supports 18 locked in the supporting position a reserve bale 21 is placed on each of bale supports 18. It must be emphasized that reserve bales 21 are in addition to whatever bales are placed within enclosure 14 of bale feeder 10. Reserve bales 21 are not intended for immediate consumption by the animals and the placement on top peripheral edge 20 of wall structure 12 does not permit the animals access to the reserve bales. When one of reserve bales 21 is required, pin 24 is pulled out of loops 26 thereby releasing locking mechanism 22. When locking mechanism 22 is no longer secured to wall structure 12, there is no longer anything preventing the weight of reserve bale 21 to cause an overbalancing of bale support 18 in response to which bale support 18 pivots to an unloading position and a reserve bale 21 slides or rolls down the incline of bale support 18 into enclosure 14.

It will be apparent to one skilled in the art that modifications can be made to the illustrated embodiment of the invention without departing from the spirit and scope of the invention as defined by the claims.

The embodiments of the invention in which an exclusive property or privilege is claimed are defined as follows:

1. A feeder for bales of feed material, comprising:
   a. a wall structure defining an enclosure adapted to receive one or more bales of feed material, the wall structure having openings whereby animals gain access to the feed material;
   b. at least one reserve bale support mounted on a top peripheral edge of the wall structure, the at least one bale support being pivotally moveable from a substantially horizontal supporting position to a substantially inwardly inclined unloading position, such that in the unloading position the inclined at least one bale support serves as the means for moving a reserve bale from the at least one bale support into the enclosure as the reserve bale slides down the incline into the enclosure, means being provided for maintaining the at least one bale support in a supporting position until the reserve bale is required.

2. A feeder for bales of feed material as defined in claim 1, the means for maintaining the at least one bale support in a supporting position being a locking mechanism releasably attached to the wall structure.

3. A feeder for bales of feed material, comprising:

a. a wall structure defining an enclosure adapted to receive one or more bales of feed material, the wall structure having openings whereby animals gain access to the feed material; and b. at least one reserve bale support mounted on a top peripheral edge of the wall structure, the at least one bale support being pivotally moveable from a substantially horizontal supporting position to a substantially inwardly inclined unloading position, the at least one bale support having a locking mechanism releasably attached to the wall structure whereby the at least one bale support is maintained in a supporting position such that upon the locking mechanism being released from attachment to the wall structure the at least one bale support pivots to an unloading position and a reserve bale slides down the incline into the enclosure.

* * * * *